United States Patent [19]

Frost et al.

[11] Patent Number: 4,655,067

[45] Date of Patent: Apr. 7, 1987

[54] PANEL FORMING LINE

[75] Inventors: Terry Frost, Rockford, Wash.; Terry B. Smith, Coeur D'Alene, Id.

[73] Assignee: ASC Machine Tools, Inc., Spokane, Wash.

[21] Appl. No.: 846,298

[22] Filed: Mar. 31, 1986

[51] Int. Cl.$^4$ .............................................. B21D 35/00
[52] U.S. Cl. ........................................ 72/131; 83/208;
83/209; 83/236; 83/364; 83/365; 83/367
[58] Field of Search .................... 72/131, 132, 181;
83/236, 208, 209, 364, 365, 367

[56] References Cited

U.S. PATENT DOCUMENTS

| | | | |
|---|---|---|---|
| 2,165,917 | 7/1939 | Black | 164/61 |
| 2,867,824 | 1/1959 | O'Connor | 10/86 |
| 3,393,547 | 7/1968 | Kortan | 72/131 |
| 3,768,349 | 10/1973 | Cauffiel | 83/42 |
| 3,808,861 | 5/1974 | Plegat | 72/132 |
| 3,978,703 | 9/1976 | Primich et al. | 72/131 |
| 4,158,301 | 6/1979 | Smith | 72/183 |
| 4,304,114 | 12/1981 | Wiig | 72/131 X |
| 4,365,492 | 12/1982 | Kortan et al. | 72/10 |
| 4,375,759 | 3/1983 | Gentile | 72/131 |
| 4,549,422 | 10/1985 | Harrow | 72/131 |

Primary Examiner—Frank T. Yost
Attorney, Agent, or Firm—Bill D. McCarthy

[57] ABSTRACT

A method and apparatus for cutting predetermined lengths of panels from a continuous strip of flexible material and for forming the lengths of panel members to have a preselected panel profile. The strip is reel fed to a first strip driving station which drives the strip through a shearing station, over a hump table, to a second strip driving station and through a strip forming station. In sequence, the second strip driving station brakes the leading portion of the strip to effect a strip hump over the hump table, which is detected by a protoelectric sensor for hump height and signals the first strip driving station to vary its feed rate to maintain the hump; the second driving station is then signaled to commence driving the lead portion of the strip to the strip forming station. When a predetermined panel length is detected by the first strip driving station, it slows and stops the strip and signals the shearing station to cut the strip, whereupon, during this strip feed pause, the hump dissipates as it continues to feed the terminal portion of the panel length to the strip forming station.

16 Claims, 7 Drawing Figures

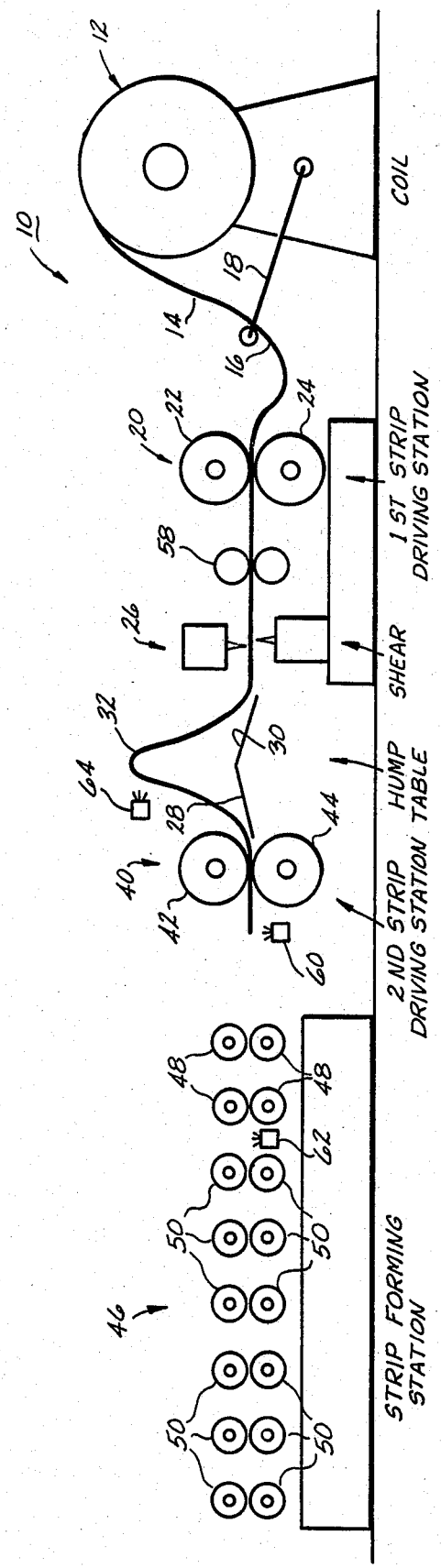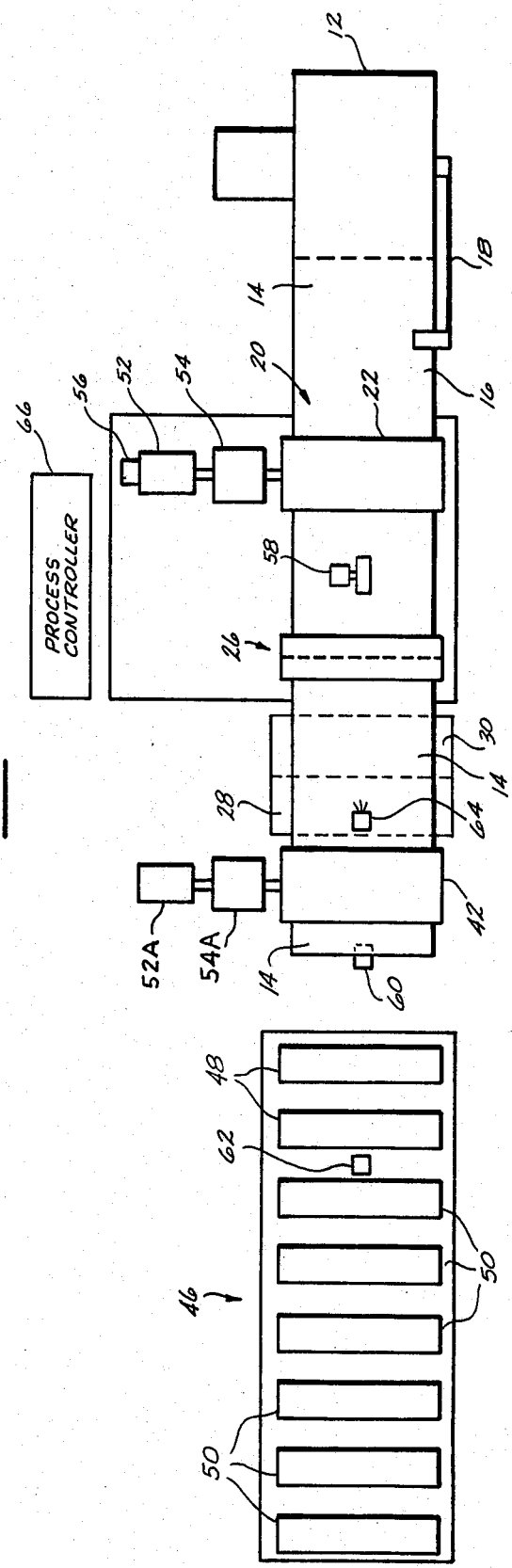

PANEL FORMING LINE

BACKGROUND OF INVENTION

1. Field of the Invention

The present invention relates generally to the field of machine operations on continuous web materials, and more particularly but not by way of limitation, to the control of intermittent and continuous work stations in a panel forming line which cuts accurately measured lengths of a flexible strip material and forms the lengths into profiled panels.

2. Discussion of the Prior Art

In the past, various methods have been employed for coupling an intermittently performed machine operation, such as shearing, in a continuously moving line, such as a roll forming operation on a flexible sheet or strip of metal. Basically, three types of automatic shearing machines have been used: those in which the travel of the strip material is stopped for actuation of the shearing station; those in which the strip travel is slowed and rapid action shears are used, with the shears effecting a momentary halt to the strip travel; and those using a moving shear assembly to compensate for strip travel.

Because of the high cost, both manufacturing and upkeep, of automatic shearing stations using moving or flying shears, prior art solutions have incorporated the hump table as a method for providing a variable inventory of strip material within the boundaries of the line operations. That is, a loop of the flexible strip material is caused to be formed at the intermittent work station so that the material can be continuously fed to other work stations while being stopped to accommodate the intermittent operation. This permits those operations, such as shearing and punching, to be performed on the stopped strip portion as inventory in the hump momentarily accumulates.

In Kortan, U.S. Pat. No. 3,393,547, a metal strip 2 is fed from a coil reel 1 through a prenotching press 5, forming mill 13 and punch cut-off 20. Loop pits 4 and 12 are provided on either side of press 5, and light indicators 14 maintain loop conditions. Thus, the continuous roll forming mill 13 is accommodated as is the intermittent prenotching press 5. Similarly, Kortan et al., U.S. Pat. No. 4,365,492 teaches the use of festoons, or loops, 13 and 14 in a strip line.

In O'Connor, U.S. Pat. No. 2,867,824, a strip 28 is fed from reel 32 through punch press 44 and rolling apparatus 34 to a coiling mechanism 38. The rolling apparatus 34 comprises a plurality of roller sets 36, 50 that are continuously driven to fold the strip progressively, while the punch press 44 is intermittently actuated. A loop 48 in the sheet material strip is maintained between the punch press 44 and the rolling apparatus 34. No disclosure is provided as to the forming and maintenance of the loop 48.

In Primich et al., U.S. Pat. No. 3,978,703, a hump table 30 is provided between a feeder and straightener unit 18 and a speed control station 32. A strip of material 10 is provided at a constant rate from a feed coil 12. The strip 10 is slowed via driver and pinch rollers 40, 56 of the speed control 32 as the leading edge of the strip 10 passes by micro switches 100, 104 disposed along a discharge table 38. In a specified timing sequence, shear 36 is actuated while the speed of the strip has been slowed, during which time the upstream portion of strip 10 is caused to hump over the hump table 30. This hump is dissipated once shearing has occurred and the slowed portion of strip 10 is accelerated to the higher traveling speed of the unreeling feed stock by the rollers 40, 56.

In Cauffiel, U.S. Pat. No. 3,768,349, two loops are formed. The first one over hump table 46 and the second one over hump table 56. The first hump (hump table 46) forms due to continuous feed of strip material 26 at the front end via leveler station 34, which serves to drive and straighten the uncoiling material, and due to the slow down of the strip material 26 by a pair of quick-closing, slow down rolls 50, 52 of a material-engaging and retarding unit 54. The second hump (hump table 56) is formed as material is momentarily stopped by the cutting actuation of the shear 64. The first loop, designated by the numerals 70, 76 and 80, varies in size, or material inventory, during the timing sequence of the operation.

Other patent teachings of general interest in this field include the following: Black, U.S. Pat. No. 2,165,917, teaches a hump table 52 disposed between an uncoiling and leveling unit 8 and a shearing unit 10. Smith, U.S. Pat. No. 4,158,301, also teaches a hump table 16 positioned immediately downstream of apparatus 10 which serves to withdraw coil sheet material 15 from a roll 12 to remove coil set therefrom; Gentile, U.S. Pat. No. 4,375,759, shows a hump formed between a decoiling arrangement and a press; and Plegat, U.S. Pat. No. 3,808,861, shows a stock accumulator 5 downstream of a joining device 4.

Several of these prior art teachings have recognized the advisability of stopping the traveling strip for processing by a fixed based, intermittently actuated unit operation, such as the aforementioned shearing or punch stations. Also, recognition has been given to the fact that systems which require the feed of web stock to operate at more than one speed have been difficult and costly to make. The mass of a coil stock creates an inertia consideration, and thus it has been generally regarded as best to look to constant feed rate mechanisms on the front end of such machining lines. By storing an inventory of the strip on the machine line, the continuous nature of some of the work stations could be accommodated as well as the intermittently actuated stations. In sum, compromise of line speed or lengthy run out tables has had to be incorporated in various fashions, and have almost totally sacrificed flexibility of operator and material assignment; that is, concessions given to the continuous nature of some of the work stations have often been made which establish or at least markedly restrict the way that the machine line is operated with regard to material runs, operating personnel needed, etc.

SUMMARY OF THE INVENTION

The present invention provides an improved web processing line in which both continuous and intermittent work stations are conveniently and efficiently coupled in a manner which affords maximum flexibility to scheduling material flow and optimum operator assignment. While illustrated by the preferred embodiment described hereinbelow with regard to the forming of discreet standing seam panels and the like, it will be appreciated that the invention will find utilization in many intercoupled continuous and intermittent work stations which in combination comprise web processing lines.

More specifically, the present invention provides a method and apparatus for cutting and forming profile panels from a continuous strip of flexible material and comprises first and second strip driving stations separated by an intermittently actuated punch-shear station and a hump table. A strip forming station is set to receive the strip from the second strip driving station as it serves to progressively form the flat strip material into the profile of a standing seam panel.

The strip is pulled from a coil stock reel by drive rollers of the first strip driving station which impart longitudinal movement to the strip so that it travels along a selected travel path which includes passage through the punch-shear station, which is initially open, over the hump table and between the drive rollers of the second strip driving station. Just past the second strip driving station, which is equipped to assume driving or braking modes, there is a first sensor device disposed to detect the presence of the strip in the locale of a first selected point along the travel path; the first sensor device signals the second strip driving station to assume its braking mode, meaning that the second strip driving station, responsive to the signal from the first sensor device, grippingly engages the leading portion of the strip to stop it. Since the first strip driving station continues to advance the strip, a hump in the strip is formed to extend normal to, or away from, the travel path. The height of the hump is detected by a hump sensor device supported in elevation to the hump table's upper surface, and a hump height signal is sent thereby to (1) the second strip driving station to commence its strip driving mode, and (2) to the first strip driving station to vary its driving speed to maintain the hump height in preselected limits. When a predetermined length has passed, as measured by the first strip driving station which is equipped with encoder devices, the strip feed is slowed and stopped, and the shearing station actuates to cut the panel to length. Freed from the stopped strip, the cut portion is free to be pulled through the strip forming station.

Meanwhile, once the leading edge of the strip enters the strip forming station, it is detected by a second sensor device in the locale of a second selected point along the travel path. This second sensor signals the second strip driving station to become free wheeling, and the rollers of the forming station then have pulling control of the strip length. Once the strip has been sheared, the hump will dissipate and the terminal portion of the feed strip length will pass through the forming station for off loading.

An object of the present invention is to provide an improved method and apparatus for accommodating both continuous and intermittent work stations serving collectively in a web or strip processing line.

Another object of the present invention, while achieving the above, is to provide a more efficient and cost effective panel forming line utilizing a continuous profile forming station and an intermittent, stationary shearing station to produce discreet standing seam panels.

Another object of the present invention, while achieving the above, is to provide a panel forming line which offers ease of operation, improved flexibility of scheduling and, with less complicated components, should provide favorable maintenance performance.

Other objects, features and advantages of the present invention will be apparent from the following description when read in conjunction with the appended claims and drawings.

BRIEF DESCRIPTION OF THE DRAWINGS

FIG. 1 is a schematical, semi-detailed side elevational view of a panel forming line constructed to practice the present invention.

FIG. 2 is a top plan view of the panel forming line of FIG. 1.

DESCRIPTION

Figure 3:
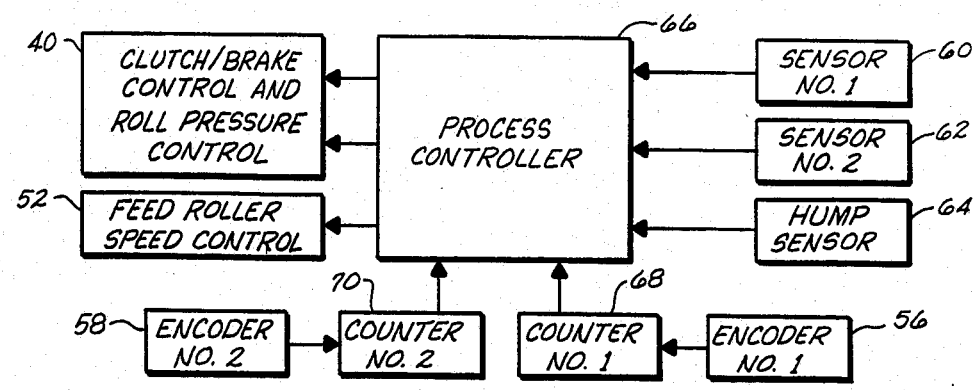
FIG. 3 is a diagrammatical representation of the controls mechanism for the panel forming line of FIG. 1.

Referring to FIGS. 1 and 2, a panel forming line is depicted therein, constructed in accordance with the present invention and comprising the following components. As the components of web forming are generally well known in the art, it will not be necessary herein to provide detailed construction details as such will be clear to persons of ordinary skill in the field of web machine operations.

10 is a panel forming line.

12 is a coil of sheet stock or, that is, an elongated strip of flexible metal wound on a drum supported for controlled unwinding.

14 is a strip of web material as it is pulled from the coil 12 and passed along a selected travel path in the panel forming line 10. The strip 14 for a standing seam panel line will be a thin, flat strip of sheet steel material of the type commonly used to produce metal roof panels.

16 is a controlled slack loop or hump in the feed portion of the strip 14.

18 is a conventional reel drive with wand control which supports the coil 12. An advancing drive (not shown) selectively rotates the coil 12 to maintain the slack loop 16 as the strip 14 is pulled therefrom.

20 is a first strip driving station.

22 and 24 are parallel and jointly driven drive rollers of the first strip driving station 20.

26 is a shear station which passes the strip 14 freely until actuated to sever a discreet length from the strip 14. The shear station 26 can also incorporate a prenotching punch or some other intermittently actuated work unit, as may be required for any particular application.

28 is a hump table.

30 is the upper surface of the hump table 28 and is curvilinearly or angularly shaped to cause a slight bow in the strip 14 in its passage therealong which is normal to the direction of travel of the strip 14 prior to its coming to the hump table 28.

32 depicts a hump, or loop, of the strip 14, formed in a manner to be discussed hereinbelow.

40 depicts a second strip driving station.

42 and 44 are parallel and jointly driven, drive rollers of the second strip driving station 40.

46 is a strip forming station of conventional construction with a plurality of forming roll dies that progressively shape the flat strip 14 into a desired profile; that is, for example, into the profile shape of a standing seam panel such as that commonly manufactured for metal roofs and the like.

48 depicts pairs of entry forming rolls of the strip forming station 46.

50 depicts other forming rolls of the strip forming station 46.

52 is an A.C. servo motor, in FIG. 2, which drives the drive roller 24; not shown is gearing which couples the arbors of the drive rollers 22 and 24 so that these rollers will counter rotate in unison. These rollers are also referred to herein as the driven roller 22 and the driving roller 24.

52A is a constant speed motor which drives the drive rollers 42, 44 of the second strip driving station 40; not shown is gearing which couples the arbors of the drive rollers 42 and 44 so that these rollers will counter rotate in unison. These rollers are also referred to herein as the driven roller 42 and the driving roller.

54 depicts a clutched braking gear box in the drive train of the drive rollers 22, 24.

54A is a clutched braking gear box in the drive train of the drive rollers 42, 44.

56 depicts an encoder mounted on the servo-motor 52.

58 depicts a second encoder which is supported past, or downstream to, the drive rollers 22, 24 and is turned as it contacts the strip 14 for the purpose made clear below.

60 designates a first sensing device which is disposed for sensing the presense of the leading edge of the strip 14 at a first selected point along the strip travel path in the panel forming line 10. The first sensing device 60 is preferably a conventional photoelectric sensor which generates a first strip arrival signal when the strip 14 travels thereover.

62 is a second sensing device which, like the first sensing device 60, is a photoelectric sensor, senses the presence of the leading edge of the strip 14. The second sensing device 62 is disposed at a second selected point along the strip travel path past, or downstream to, the entry drive rolls 48 of the strip forming station 46. When its beam is interrupted by the leading portion of strip 14, the second sensing device 62 generates a second strip arrival signal.

64 designates a hump sensing device which is disposed to detect the presence of the hump 32 over the hump table 28. The hump sensing device 64 is preferably a conventional protoelectric sensor which can generate a hump height signal when the hump 32 breaks its beam.

66 is a computer process controller capable of controlling the operational sequencing of the various work stations of the panel forming line 10. While the function of the process controller 66 will be described hereinbelow, its actual construction need not be detailed herein as such controllers are commonly used to control many industrial lines today.

68 and 70 are counters for the process controller 66 which are respectively signal coupled to the encoders 56 and 58.

With regard to further details of the panel forming line 10, some comment on the construction and operation of the first strip driving station 20 may be useful, although it is thought unnecessary to include detailed drawings of such. The reason for this is that such drive rollers are conventional; however, a brief discussion may add some clarity to the description provided hereinbelow to the process controller 66 in its sequencing control. The feed drive rollers 22, 24 are bearingly mounted, and gearingly coupled, in vertically extending frame members in substantial parallel proximity, and the top roller, drive roller 22, has a pair of air cylinders affixed to the opposing ends of its supporting arbor in order to vary the distance between the rolling surfaces of the drive rollers 22, 24 and to thus vary the pressure exerted by the rollers upon the strip material 14 which is grippingly held and advanced by the driving power imposed via the A.C. servo motor 52 and gear box 54 combination. If desired, one or both of the feed drive rollers 22, 24 can be urethane coated. The construction of the second strip driving station 40 is similar, except that its drive motor can be a fixed speed unit, and that it is not equipped with an encoder unit. The encoders designated as 56 and 58 can be any one of several commercially available units, such as Model No. E256-4H-100 manufactured by BEI Electronics, Inc. of Goleta, Calif.

It will be recognized by persons skilled in web forming that there are various other components which are incorporated in the forming line 10 but which need not be described herein. For example, edge guiding rails are utilized along the strip travel path (except at the hump 32 itself), and there are numerous details, such as those of the form rolling mill 46, the inclusion of which would simply add great bulk to the present disclosure without any attending benefit to persons of ordinary skill in panel forming and the like. Instead, such details are minimized and omitted as believed necessary to provide herein the disclosure information required by the person of ordinary skill to make and use the invention, and to provide that person such information on the best mode presently known for carrying out the invention.

The coil 12 can be a hydraulic uncoiler which holds the coil stock to enable it to decoil under controlled conditions by means of the loop sensing portion of the reel drive 18 as the strip 14 is unwound. As known, this controlled rotation of the coil 12 is achieved by a combination of on/off directional valves and a trottle-type flow control valve which maintains an optimum flow rate to the decoiler motor at all mill speeds.

The unwinding strip 14 is pulled to the panel forming line 10 at a preset speed by the process controlled, A.C. servo motor driven drive rollers 22, 24 of the first strip driving station 20. Initially, the strip 14 is advanced by jogging the feed drive rollers 22, 24 until the strip extends through the shear station 26 where the strip is sheared and stopped. If punching operations are included, this leading edge of the strip is also punched or prenotched as required. This operation sets the datum line end for the control computer length measurement system. The forming line 10 is now ready to be run under its automatic control mode.

Figure 4:
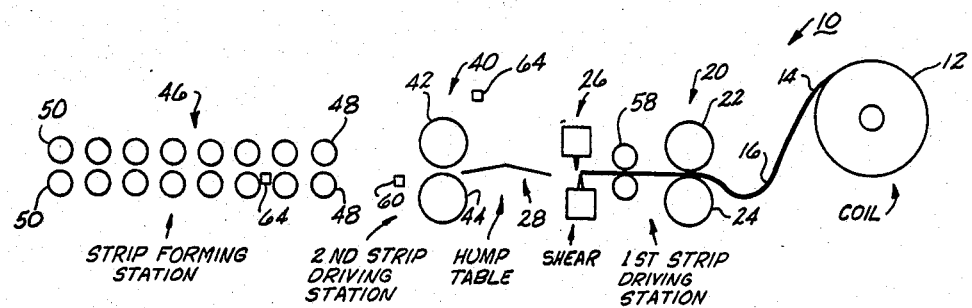
FIGS. 4 through 7 are schematic depictions showing the cyclic operation of a discreet length of strip material in its formation and travel through the panel forming line of FIG. 1.

On start up, and during each cycle, the leading edge of the strip 14 will be at the shear station 26, as depicted in FIG. 4. To begin a cycle of operation, the first strip driving station 20 is started and run at its preset speed by the process controller 66. The flexible strip 14 will travel over, and conform to the shape of the surface of, the hump table 28 and pass to and through the drive rollers 42, 44 of the second strip driving station 40, which also has been started. In most instances, where the strip material is sufficiently flexible, the leading edge of the strip 14 will be guided into the drive rollers 42, 44. In some cases, due to the flexing characteristics of the strip material, it is known to use bumpers or the like conveniently disposed over the hump table to urge the leading portion of the strip 14 to track into the drive rollers 42, 44.

Figure 5:
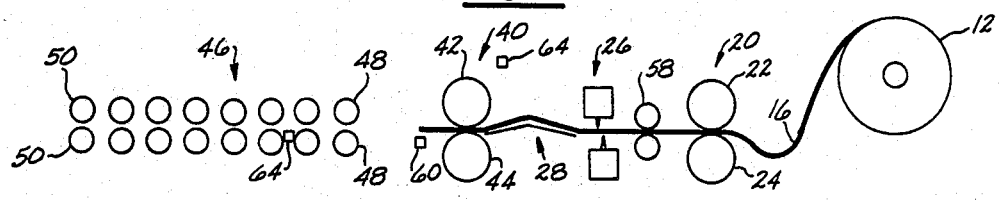

The leading portion of the strip 14 continues until it is detected by the first sensing device 60 which sends a first strip arrival signal to the process controller 66 which in turn signals release of the clutch 54A on the continuously running motor 52A and brakes the drive rollers 42, 44 of the second strip driving station 40. (FIG. 5 depicts the position of the leading portion of the strip 14 at this stage.) The drive rollers 42, 44 stop the travel motion of the leading portion of the strip 14 while the feed drive rollers 22, 24 (of the first strip driving station 20) continue to advance the strip 14 along the forming line 10.

Figure 6:
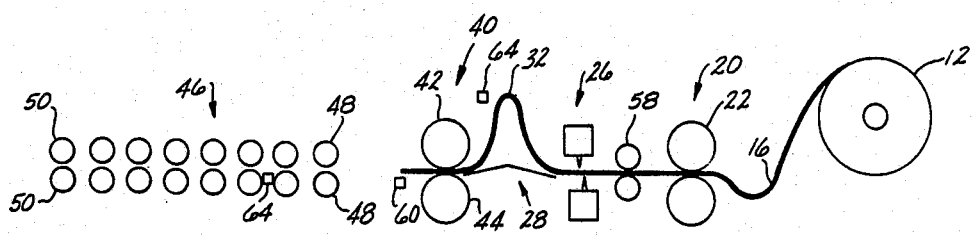

This forward end stoppage and rearward end feeding of the strip 14 causes hump 32 to form, as depicted in FIG. 6. When the hump 32 reaches a height to be detected by the hump sensing device 64, a hump height signal is sent to the process controller 66 which releases the previously applied brake 54A and reapplies the clutch on the continuously running motor 52A which drives the rollers 42, 44 (of the second strip driving station 40). This causes the leading portion of the strip 14 to advance to the continuous roll former or strip forming station 46. As the leading portion of the strip 14 passes the second sensing device 62, a second strip arrival signal is sent to the process controller 66 which releases the pressure of the drive rollers 42, 44 (that is, these rollers are momentarily free wheeling) to allow the strip forming station 46 to control the pulling and guiding of the strip 14 as it is progressively profile formed by the forming rolls 48, 50 thereof.

The strip 14 continues to be unwound from coil 12 and the height of the previously developed hump 32 is maintained under the detection control of the hump sensing device 64 and the process controller 66, which signals to increase or decrease the speed of the feed drive rollers 22, 24 (of the first strip driving station) via the A.C. servo motor 52. This continues until the approach of a predetermined length of the strip 14; this is detected by the encoders 56 and 58 which are disposed to continually send counting pulses (proportional to the length of strip travel) to counters 68 and 70 in a conventional closed loop and feedback comparison for calculation of travel length of the strip 14 by the process controller 66.

Figure 7:
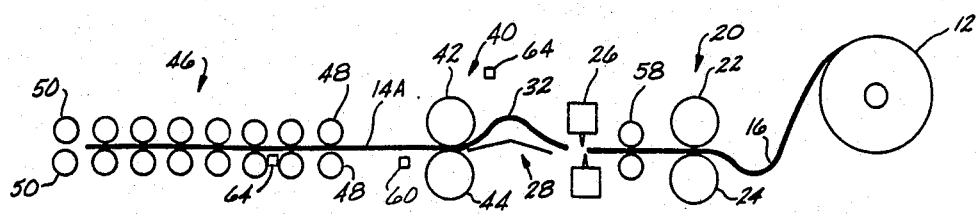

Upon the approach of the predetermined panel length, the process controller 66 signals the servo motor 52 to slow and then stop the feed drive rollers 22, 24 so that the rear datum lines comes to rest precisely in the shear station 26, which is then signaled to actuate by the process controller 66. The sheared length of strip 14 is then free to be advanced by the pulling and driving action of the strip forming station 46. This stage in the operation of the panel forming line 10 is depicted in FIG. 7 which reflects the dissipation of the hump 32 as the severed panel strip 14A is now traveling unhindered by the rear portion of the strip 14 which has been momentarily stopped.

Throughout its short life, the hump 32 serves as a supply inventory within the process boundaries of the panel forming line 10. That is, the hump 32 is a loop which is purposefully grown at the start of each panel cycle to extend upward from the travel path when strip arrival into the hump area exceeds strip removal from the hump area. The hump then will remain until such time that the strip output and strip input, as determined in unit lengths of the strip 14, equalize, meaning that the hump storage of strip length has dissipated. The present invention differs from known processes in that this hump inventory is reestablished at the start of each panel cycle, and then is completely dissipated upon severance of the panel length from the stopped portion of strip material 14.

The above description has been for the forming and cutting of one panel length. In operation, the process controller 66 would pause for a time selected and set by the line operator, following which pause time the panel forming line 10 would again go through the steps described and depicted in FIGS. 4 through 7 above. As the discreet panel members are formed and exit the strip forming station 46, one or more operators will stack same, or a downstacker or run out table (neither shown) can be incorporated as desired.

The unique coupling of the continuous strip forming station 46 and the shear station 26 provides the capability of forming and cutting panels to any desired length and at any desired rate of panel production, within the panel forming capability of the strip forming station, of course. Except for the brief time of reestablishing the hump 32 in each cycle, the strip forming station can be fed strip material nearly continuously. Also, the panel forming line 10, due to its unique simulated continuous operation interrupted by planned line pauses, can conveniently be started and stopped upon demand to fill discreet order sizes. This permits the panel forming line 10 to be manned by multiple operators when maximum production is required, or it can be attended by a single operator by setting the pause to permit for longer the downloading operation.

The present invention has been illustrated in a panel forming line in which a flexible sheet material is cut into discrete panel lengths and then formed with rolling dies to have the profile of a roof panel, such as for example, that of a standing seam roof panel, although the profile shape is not limiting.

It is clear that the present invention is well adapted to carry out the objects and attain the ends and advantages mentioned as well as those inherent therein. While a presently preferred embodiments of the invention has been described for purposes of this disclosure, numerous changes may be made which will readily suggest themselves to those skilled in the art and which are encompassed within the spirit of the invention disclosed and as defined in the appeded claims.

We claim:

1. An improved method of cutting and forming profiled panels from a continuous strip of flexible material, comprising the steps of:
(a) passing the material from a source of same in a selected travel path from said source until the leading portion of the material has reached a first selected point along said travel path;
(b) restraining the leading portion of the material while continuing to pass material from the source so that a hump is formed to extend generally normal to the travel path and to a preselected hump height;
(c) terminating the restraint of the leading portion of the material and again passing same along the travel path;
(d) passing the material exiting the hump through a forming operation to form the material into a selected panel profile;
(e) stopping a terminal portion of the material when a selected panel length has passed from the source, the leading portion of the material continuing to pass along the travel path; and
(f) shearing the material at the stopped terminal portion so that the material past the shearing station is free to continue passing along the travel path, the hump being dissipated as the terminal portion of the sheared panel length passes therethrough.

2. The method of claim 1 further comprising the step of:

(g) sensing the arrival of the leading portion of the material at the first selected point and generating a first strip arrival signal; and wherein step (b), restraining the leading portion of the material, is performed by drive rollers equipped to brake the leading portion in response to the first strip arrival signal.

3. The method of claim 2 further comprising the step of:

(h) sensing the height of the hump and generating a hump height signal; and wherein step (c), terminating the restraint and again passing the leading portion, is performed by the drive rollers in response to the hump height signal.

4. The method of claim 3 wherein step (a), passing the material from the source, is performed by variable drive rollers which can vary the rate of travel of the material in response to the hump height signal and wherein the height of the hump is maintained by said variable drive rollers until the performance of step (e).

5. The method of claim 4 wherein step (e), stopping a terminal portion of the material, is performed by the variable drive rollers being caused to brake the material from the source.

6. The method of claim 5 further comprising the step of:

(i) sensing the arrival of the leading portion of the material at a second selected point and generating a second strip arrival signal; and wherein the drive rollers of step (b) are caused to be free wheeling in response to the second strip arrival signal, and wherein the second selected point is spatially disposed to be reached by the leading edge of the material after the commencement of step (d), forming the material into a selected panel profile.

7. Apparatus for cutting and forming profiled panels from a continuous strip of flexible material, comprising:

first strip driving means for effecting longitudinal movement to the strip from a source of same along a selected strip travel path at variable travel rates of the strip;

first sensing means for sensing the presense of the strip in the locale of a first selected point along the strip travel path and generating a first strip arrival signal in response thereto;

second strip driving means for selectively moving and braking the strip, the second strip driving means spatially disposed to contact the material prior to the travel of same to the first selected point, the second strip driving means responsive to the first strip arrival signal;

shear means for shearing the strip, the shear means disposed between the first strip driving means and the second strip driving means;

hump means disposed between the shear means and the second strip driving means for effecting a hump in the strip, the hump to extend away from the travel path when strip arrival into the hump area exceeds strip removal from the hump area, the hump remaining until such time that strip output and strip input to the hump area equalize; and strip forming means for moving and forming the strip into a selected panel profile as the strip is moved in its travel path past the second strip driving means.

8. The apparatus of claim 7 wherein the hump means comprises:

a hump table having an upper surface shaped bow the strip normal to its travel path.

9. The apparatus of claim 8 further comprising:

hump sensing means supported in elevation hump sensing means supported in elevation to the hump table's upper surface for sensing the hump of the strip when one is formed and for generating a hump height signal in response to the presense of a hump, the first strip driving means responsive to the hump height signal to vary the rate of travel of the strip from the source of same.

10. The apparatus of claim 9 further comprising:

second sensing means for sensing the presense of the strip in the locale of a second selected point disposed past the strip entry to the forming means and generating a second strip arrival signal in response to the strip, the second strip driving means responsive to the second strip arrival signal to be free wheeling in responsive thereto.

11. The apparatus of claim 10 further comprising:

reel means for supporting a supply of the strip material and unreeling the strip in response to the first strip driving means.

12. The apparatus of claim 11 wherein the first strip driving means comprises:

a driven roller;

a driving roller disposed in substantial parallel proximity to the driven roller so that the strip of flexible material can be gripped therebetween; and variable drive means for selectively imparting rotational movement to the driving roller and for braking the driving wheel, the strip being selectively driven by and braked by the driven and driving rollers.

13. The apparatus of claim 11 wherein the second strip driving means comprises:

a driven roller;

a driving roller disposed in substantial parallel proximity to the driven roller so that the strip of flexible material can be gripped therebetween;

drive means for selectively imparting rotational movement to the driving roller, selectively braking the driving roller and selectively free wheeling the driving roller.

14. The apparatus of claim 10 wherein the second sensing means comprises a photoelectric sensing device disposed along the travel path near the second selected point.

15. The apparatus of claim 9 wherein the hump sensing means comprises a photoelectric sensing device disposed at an elevated position along the travel path in near proximity to where a hump in the the strip is formed over the hump table.

16. The apparatus of claim 7 wherein the first sensing means comprises a photoelectric sensing device disposed along the travel path near the first selected point.

* * * * *

UNITED STATES PATENT AND TRADEMARK OFFICE
CERTIFICATE OF CORRECTION

PATENT NO. : 4,655,067

DATED : April 7, 1987

INVENTOR(S) : Terry Frost and Terry B. Smith

It is certified that error appears in the above-identified patent and that said Letters Patent is hereby corrected as shown below:

In column 8, line 44, the word "appeded" should read --appended--. In claim 9, column 10, lines 11 and 12, after the word "elevation" delete the words "hump sensing means supported in elevation".

Signed and Sealed this

Twelfth Day of July, 1988

Attest:

DONALD J. QUIGG

*Attesting Officer*   *Commissioner of Patents and Trademarks*